(12) United States Patent
Choi

(10) Patent No.: US 10,194,754 B2
(45) Date of Patent: Feb. 5, 2019

(54) FUNCTIONAL CHAIR

(71) Applicant: Woo-Jin Choi, Yongin-si (KR)

(72) Inventor: Woo-Jin Choi, Yongin-si (KR)

( * ) Notice: Subject to any disclaimer, the term of this patent is extended or adjusted under 35 U.S.C. 154(b) by 39 days.

(21) Appl. No.: 15/507,466

(22) PCT Filed: Mar. 2, 2016

(86) PCT No.: PCT/KR2016/002049
§ 371 (c)(1),
(2) Date: Feb. 28, 2017

(87) PCT Pub. No.: WO2017/099295
PCT Pub. Date: Jun. 15, 2017

(65) Prior Publication Data
US 2018/0235377 A1 Aug. 23, 2018

(30) Foreign Application Priority Data
Dec. 7, 2015 (KR) .................. 10-2015-0173484

(51) Int. Cl.
*A47C 7/14* (2006.01)
*A47C 31/12* (2006.01)
(Continued)

(52) U.S. Cl.
CPC .............. *A47C 31/126* (2013.01); *A47C 3/30* (2013.01); *A47C 7/024* (2013.01); *A47C 7/14* (2013.01);
(Continued)

(58) Field of Classification Search
CPC ......... A47C 31/126; A47C 3/30; A47C 7/024; A47C 7/14; A47C 7/405; A47C 7/46; G05B 15/02
(Continued)

(56) References Cited

U.S. PATENT DOCUMENTS 2,799,323 A * 7/1957 Berg .................. A47C 3/025
297/312 X
5,024,485 A * 6/1991 Berg .................. A47C 3/025
297/312 X
(Continued)

FOREIGN PATENT DOCUMENTS

JP 2010-264092 11/2010
KR 20-0256511 Y1 12/2001
(Continued)

*Primary Examiner* — Rodney B White
(74) *Attorney, Agent, or Firm* — Lee & Associates, LLC

(57) ABSTRACT

Disclosed is a functional chair capable of adjusting a height of a seat. The functional chair includes a first seat configured to support a left pelvis, a second seat provided at a right side of the first seat, a frame provided below the first seat and the second seat, a backrest protruding from one side of the first and second seats, a seat pressure measuring unit which is respectively provided on the first seat and the second seat, a controller which receives the first pressure value and the second pressure value from the seat pressure measuring unit, a memory which stores in advance drive command information corresponding to a difference between the first pressure value and the second pressure value, a first height adjusting unit provided between the first seat and the frame, and a second height adjusting unit provided between the second seat and the frame.

9 Claims, 6 Drawing Sheets

(51) Int. Cl.
 *A47C 7/46* (2006.01)
 *A47C 3/30* (2006.01)
 *A47C 7/02* (2006.01)
 *A47C 7/40* (2006.01)
 *G05B 15/02* (2006.01)

(52) U.S. Cl.
 CPC ............... *A47C 7/405* (2013.01); *A47C 7/46* (2013.01); *G05B 15/02* (2013.01)

(58) Field of Classification Search
 USPC .................. 297/217.2, 312, 300.1–303.5
 See application file for complete search history.

(56) References Cited

U.S. PATENT DOCUMENTS

| | | | | |
|---|---|---|---|---|
| 5,288,127 A * | 2/1994 | Berg | ............... | A47C 3/025 |
| | | | | 297/312 X |
| 5,713,632 A * | 2/1998 | Su | ............... | A47C 7/022 |
| | | | | 297/312 X |
| 6,079,782 A * | 6/2000 | Berg | ............... | A47C 7/022 |
| | | | | 297/312 X |
| 6,422,649 B2 * | 7/2002 | Hancock | ............... | A47C 3/026 |
| | | | | 297/312 X |
| 6,425,153 B1 * | 7/2002 | Reswick | ............... | A47C 7/024 |
| | | | | 297/452.53 |
| 6,893,090 B1 * | 5/2005 | Van Deursen | ......... | A47C 7/024 |
| | | | | 297/312 |
| 7,350,863 B2 * | 4/2008 | Engels | ............... | A47C 3/20 |
| | | | | 297/312 X |
| 7,387,339 B2 * | 6/2008 | Bykov | ............... | A47C 3/0252 |
| | | | | 297/312 |
| 9,808,194 B2 * | 11/2017 | Bhat | ............... | A61B 5/447 |
| 2004/0245836 A1 * | 12/2004 | Kropa | ............... | A47C 7/024 |
| | | | | 297/312 X |
| 2005/0017565 A1 * | 1/2005 | Sprouse, II | ............... | A47C 7/14 |
| | | | | 297/452.41 |
| 2006/0152053 A1 * | 7/2006 | Kim | ............... | A47C 1/023 |
| | | | | 297/312 |
| 2008/0265641 A1 * | 10/2008 | Kim | ............... | A47C 7/024 |
| | | | | 297/312 |
| 2009/0278388 A1 * | 11/2009 | Reingewirtz | ......... | A47C 3/025 |
| | | | | 297/217.2 |
| 2010/0207434 A1 * | 8/2010 | Kurrasch | ............... | A47C 1/0242 |
| | | | | 297/217.2 |
| 2013/0057038 A1 * | 3/2013 | Gloeckl | ............... | A47C 7/024 |
| | | | | 297/312 |
| 2014/0132051 A1 * | 5/2014 | Freedman | ............... | A47C 7/024 |
| | | | | 297/312 |
| 2015/0123436 A1 * | 5/2015 | Boyer | ............... | B60N 2/646 |
| | | | | 297/217.2 |
| 2015/0209206 A1 * | 7/2015 | Bargellini | ............ | A61G 5/1043 |
| | | | | 297/217.2 |
| 2016/0089083 A1 * | 3/2016 | Sutton | ................ | A61B 5/6891 |
| | | | | 600/587 |
| 2016/0157612 A1 * | 6/2016 | Lim | ............... | A63J 25/00 |
| | | | | 297/217.2 |
| 2016/0183687 A1 * | 6/2016 | Hoyt | ............... | A47C 31/126 |
| | | | | 297/217.2 |
| 2018/0199729 A1 * | 7/2018 | Bullard | ............... | A61G 5/10 |

FOREIGN PATENT DOCUMENTS

| | | |
|---|---|---|
| KR | 10-0997074 B1 | 11/2010 |
| KR | 10-2011-0049941 | 5/2011 |
| KR | 10-2011-0089646 | 8/2011 |
| KR | 10-1423423 | 7/2014 |
| KR | 10-1572668 | 11/2015 |

\* cited by examiner

FUNCTIONAL CHAIR

CROSS-REFERENCE TO RELATED APPLICATIONS

This application is a national stage application of International Patent Application No. PCT/KR2016/002049 filed on Mar. 2, 2016, which claims priority to Korean Patent Application No. 10-2015-0173484 filed on Dec. 7, 2015, the entire contents of which are incorporated by reference herein.

TECHNICAL FIELD

The present invention relates to a functional chair, and, more particularly, to a functional chair capable of adjusting a height of a seat according to a body type and posture of a user.

BACKGROUND

Human's spine includes cervical vertebrae, thoracic vertebrae, and lumbar vertebrae. A tailbone which is located at an end of the lumbar can cause serious pain if the user sits on the chair for a long time or does excessive labor.

Recently, as more time is spent on the chair at home and work, sitting on the chair in a correct posture becomes important. Pelvises are the most important part of a body balance since the pelvises support the spine and connect the spine and a lower body.

Also, dislocation of the pelvises causes thighs and calves to be bent, and therefore one must be careful of the pelvises. If a user with twisted pelvises sits on the chair for a long time, muscles and ligaments around the left and right are varied in tension, thereby causing pain and muscle stress. Also, it may cause backache and pelvic pain, and later lead to symptoms like thigh muscle stiffness or neck pain.

One example of a functional chair is disclosed in Korean Patent No. 10-0997074 (registered on Nov. 23, 2010), which includes a backrest, a base plate, armrests, legs, and supports for supporting the armrests. The functional chair further includes a posture correcting assembly having a plurality of springs spaced and arranged on a top surface of the base plate at regular intervals; a seat part having a first seat and a second seat which are divided in a direction of a butt's crack, and are connected to the springs to be moved in all directions according to loads applied to the first and second seats; a pair of moving parts which are provided with a slit extending on a bottom surface thereof in a longitudinal direction through which the supports pass, the armrest passing an inside of each moving part and being slidable in a forward and backward direction of the armrest; an elastic band of a desired width which is coupled to the pair of moving parts in a vertical direction from one side of an outer surface of the backrest and crosses the pair of moving parts, wherein the elastic band presses a user's waist such a way that the moving parts are slid to maintain lordosis of the lumbar vertebrae.

An example of a chair for correcting a pelvis is disclosed in Korean Utility Model No. 20-0256511 (registered on Nov. 24, 2001), which includes a seat part consisting of a pair of seats which are arranged at left and right sides and can be independently controlled in height; a support leg which is connected to a bottom surface of the seat part; and a backrest which is connected to the support leg at one side thereof.

As described above, the chairs for correcting the user's posture according to the related arts have a problem in that the seat part consisting of plural seat parts is separated from each other from side to side to disperse loads to be applied from left and right sides, but the loads to be applied from the left and right sides cannot be uniformly dispersed while keeping balance of a user's spine. That is, people having a bilaterally symmetric spine and left and right pelvises of the same level are up to 20% of the population, but the remaining populations of 80% should deform the shape of the chair to disperse his or her weight, according to his or her body type. If not, a load is applied to a specific portion of the body. In the case where a person stands at the position of attention or takes a fixed posture for one more hour, and this situation is repeated, it causes the backache and leads to the degenerative diseases in the spine and the pelvises.

In addition, a lordosis angle of the lumbar or a kyphosis angle of the thoracic vertebrae differs from individual to individual when the user bends his or her body back. Accordingly, since a backrest is fixed in a stationary shape, or the shape of a backrest is flexibly changed according to the degree of movement when the user bends the upper body back while sitting on the chair, based on average angles of the lordosis angle of the lumbar and the kyphosis angle of the thoracic vertebrae, there is a limit to taking a stable posture.

Furthermore, in the case where the backrest of the chair is tilted in a forward or rearward direction, heights of left and right back muscles are different from each other, but there is no product capable of compensating the height difference.

SUMMARY OF THE DISCLOSURE

Therefore, the present invention has been made in view of the above-mentioned problems, and an object of the present invention is to provide a functional chair having a seat of which a first seat and a second seat are separately formed and a height of the first and second seats is independently adjusted to respectively support left and right pelvises and thus keep a balance of a spine.

Another object of the present invention is to provide a functional chair capable of suppressing thoracic vertebrae and lumbar vertebrae from twisting when sitting on the chair, by use of a backrest of which left and right sides are separated and a height of the left and right sides is independently adjusted.

To accomplish the above-mentioned object, according to one aspect of the present invention, there is provided a functional chair including a first seat configured to support a left pelvis; a second seat which is provided at a right side of the first seat and is configured to support a left pelvis; a frame which is provided below the first seat and the second seat to support the first and second seats; a backrest which protrudes from one side of the first and second seats in an upward direction to support a user's back; a seat pressure measuring unit which is respectively provided on the first seat and the second seat to measure pressure of the first and second seats and send a first pressure value and a second pressure value; a controller which receives the first pressure value and the second pressure value from the seat pressure measuring unit to generate a height adjusting signal for adjusting a height of the first and second seats; a memory which stores in advance drive command information corresponding to a difference between the first pressure value and the second pressure value; a first height adjusting unit which is provided between the first seat and the frame to adjust the height of the first seat according to the height adjusting signal from the controller; and a second height adjusting unit which is provided between the second seat and the frame to adjust the height of the second seat according to the height adjusting signal from the controller.

In one embodiment, the controller receives the first pressure values and the second pressure values from the seat pressure measuring unit for a predetermined time, calculates a first average value and a second average value, and lifts the seat having a higher value of the first average value and the second average value.

In one embodiment, the controller lifts the first seat or the second seat so that a difference between the first average value and the second average value becomes a predetermined value.

In one embodiment, if a difference between the first average value and the second average value is 10% or less, the controller generates a stop signal to stop operation of the first height adjusting unit or the second height adjusting unit.

In one embodiment, if a difference between the first average value and the second average value is 30% or more, the controller generates a warning signal to give a warning.

In one embodiment, if the pressure value from the seat pressure measuring unit is not measured, the controller generates a standby mode signal to convert the first and second height adjusting units to a standby mode.

In one embodiment, the first height adjusting unit includes two cylinder members which are respectively provided on front and rear portions, and are moved in a vertical direction, a hydraulic pump which is connected to each cylinder member to supply hydraulic pressure to the cylinder members, a plate member which is provided on each cylinder member, the first seat being positioned on the plate member, and a fixing member which is provided between the first seat and the plate member to fix the first seat and the plate member.

In one embodiment, the functional chair further includes a backrest pressure measuring unit which is respectively provided on left and right sides of the backrest to measure pressure; a first backrest adjusting unit which is provided on a rear surface of the left side of the backrest to adjust the left side of the backrest in a forward or rearward direction; and a second backrest adjusting unit which is provided on a rear surface of the right side of the backrest to adjust the right side of the backrest in the forward or rearward direction.

In one embodiment, the controller controls operation of the first backrest adjusting unit and the second backrest adjusting unit so that the pressure value of the left side of the backrest is equal to that of the right side of the backrest.

In one embodiment, the functional chair further includes a communication module which receives a height adjusting command to adjust the height of the first height adjusting unit or the second height adjusting unit and a command to request pressure data from a smartphone, and sends the commands to the controller.

With the above configuration, since the seat is divided into the first seat and the second seat so that the height of the first and second seats is independently adjusted, the left and right pelvises are respectively supported to disperse the load. In addition, it is possible to keep the balance of the spine by limiting the range of the height difference between the first seat and the second seat.

Also, there is an effect in that it is possible to keep the left and right balance of the waist by respectively supporting the left and right sides of the lumbar, thereby making the waist comfortable.

In addition, since the backrest is divided into the left side and the right side, and the height of the left and right sides is independently adjusted, it is possible to suppress the thoracic vertebrae and the lumbar vertebrae from twisting when sitting on the chair.

DETAILED DESCRIPTION OF PREFERRED EMBODIMENTS

Figure 1:
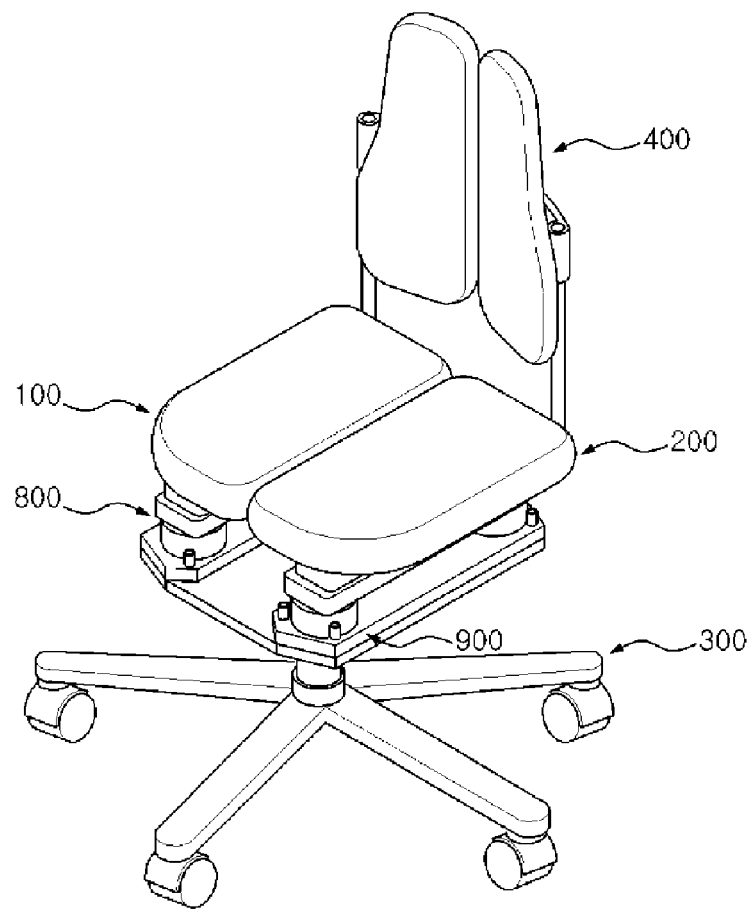
FIG. 1 is a view illustrating a functional chair according to the first embodiment of the present invention.

Hereinafter, in order to allow those skilled in the art to easily carry out the present invention, reference is made to the following detailed description taken in conjunction with the accompanying drawings. Such description is for illustrative purposes only, and it is to be understood that the scope of the present invention is not limited to the description. The embodiments are provided to easily understand the present invention, and are not intended to limit the present invention. The present invention may be varied or modified without departing from the spirit or scope defined by the appended claims. Of course, equivalents thereof are contained in the present invention.

The present invention is most clearly understood with reference to the following definitions:

It will be understood that, although the terms "first", "second", etc. may be used herein to distinguish one element from another element, the terms are not meant to limit the disclosure. These terms are only used to distinguish one element from another. For example, a first element could be termed a second element, and, similarly, a second element could be termed a first element, without departing from the scope of the example embodiments.

Also the term "couple" or "connect" is intended to mean either an indirect or direct connection. Thus if a first component is coupled to a second component, that connection may be through a direct connection, or through an indirect connection via other components, devices and connections. Other terms describing the relationship between components, such as "between" or "adjacent to", should be interpreted as described above.

As used herein, the singular forms, "a", "an" and "the", are intended to include the plural forms as well, unless the context clearly indicates otherwise. In the present application, such terminology as "comprising", "including" and the like should be construed not as necessarily including various components or steps written in the present specification but as including the components or steps in part or further including additional components or steps.

The terminology used herein is for the purpose describing particular embodiments only and is not intended to limit the right scope of the invention. Unless otherwise defined, all terms used herein have the same meaning as commonly understood by one of ordinary skill in the art to which the invention belongs, and should not be interpreted as having an excessively comprehensive meaning nor as having an excessively contracted meaning. If technical terms used herein fail to accurately express the technical idea of the present invention, they should be replaced with technical terms that allow the person skilled in the art to properly understand. In addition, general terms used herein should be interpreted according to the definitions in the dictionary or in context, and should not be interpreted as having excessively contracted meanings.

Now, a functional chair according to preferred embodiments of the present invention will be described in detail with reference to the accompanying drawings.

Figure 2:
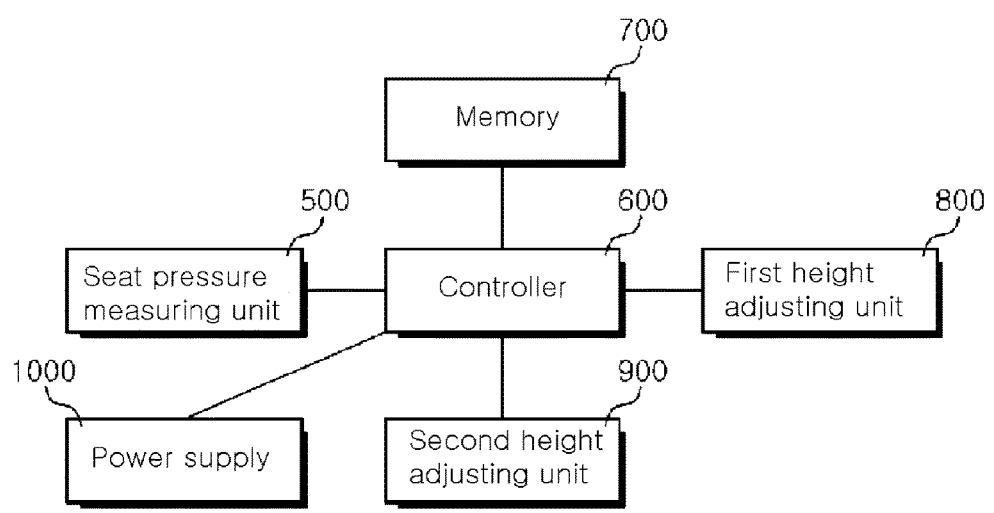
FIG. 2 is a view illustrating the functional chair according to the first embodiment of the present invention.

FIGS. 1 and 2 are views illustrating a functional chair according to the first embodiment of the present invention.

Referring to FIGS. 1 and 2, a functional chair 10 includes a first seat 100, a second seat 200, a frame 300, a backrest 400, a seat pressure measuring unit 500, a controller 600, a memory 700, a first height adjusting unit 800, and a second height adjusting unit 900.

The first seat 100 is provided on an upper left side of the frame 300 to support a left pelvis of a user.

In one embodiment, the first seat 100 may have a cushion therein to provide the user with a soft and comfortable feeling.

The second seat 200 is provided on an upper right side (right side of the first seat 100) of the frame 300 to support a right pelvis of the user.

In one embodiment, the second seat 200 may have a cushion therein to provide the user with the soft and comfortable feeling.

The frame 300 is provided below the first seat 100 and the second seat 200 to support bottom surfaces of the first and second seats 100 and 200.

In one embodiment, the frame 300 has a caster mounted to an end of each arm so that the chair can be easily moved.

The backrest 400 protrudes from one side of the first and second seats 100 and 200 in an upward direction to support a user's back.

In one embodiment, the backrest 400 may be divided into a left half and a right half to respectively support a left back and a right back.

In one embodiment, the backrest 400 may be formed at a desired angle so that the user can take a seat comfortably and the user's back can be supported.

In one embodiment, the backrest 400 can be moved in a forward or rearward direction to adjust an angle, so that the user can change his or her posture, if necessary.

In one embodiment, the backrest 400 may have a headrest provided on an upper portion thereof to support a user's neck.

The seat pressure measuring unit 500 is respectively provided on the first seat 100 and the second seat 200 to measure the pressure of the first and second seats 100 and 200 and send a first pressure value and a second pressure value to the controller 600.

In one embodiment, the seat pressure measuring unit 500 may include a contact pressure sensor and a load cell in order to measure the pressure.

In one embodiment, two seat pressure measuring units 500 may be provided on a lower portion of the first seat 200 and a lower portion of the second seat 300, or four seat pressure measuring units 500 may be provided on front and rear portions of the lower portion of the first seat 200 and front and rear portions of the lower portion of the second seat 300. Alternatively, the wanted number of seat pressure measuring units 500 may be provided on the first and second seats.

The controller 600 receives the first pressure value and the second pressure value from the seat pressure measuring unit 500 to generate a height adjusting signal for adjusting the height of the first and second seats 100 and 200.

In one embodiment, the controller 600 may receive the first pressure values and the second pressure values from the seat pressure measuring unit 500 for a predetermined time (preferably, 2 seconds), and calculate a first average value and a second average value, to lift the seat (the first seat 100 or the second seat 200) having the higher value of the first average value and the second average value.

In one embodiment, the controller 600 may generate a height adjusting signal to lift the first seat 100 or the second seat 200 so that a difference between the first average value and the second average value becomes a predetermined value (e.g., the difference between the first average value and the second average value is 10% or less), and send it to the first height adjusting unit 800 or the second height adjusting unit 900.

In one embodiment, in the case where the difference between the first average value and the second average value is 10% or less, the controller 600 may generate a stop signal to stop operation of the first height adjusting unit 800 or the second height adjusting unit 900, and send it to the first height adjusting unit 800 or the second height adjusting unit 900.

In one embodiment, in the case where the difference between the first average value and the second average value is 30% or more, the controller 600 may generate a warning signal to give a warning. In this instance, a warning sound may be outputted from a loudspeaker, or a warning message may be displayed on a screen.

In one embodiment, in the case where the pressure value from the seat pressure measuring unit 500 is not measured, the controller 600 may generate a standby mode signal to convert the first and second height adjusting units to a standby mode. If the first and second height adjusting units 800 and 900 receive the standby mode signal, the first and second height adjusting units 800 and 900 can be returned to an initial state.

In one embodiment, the controller 600 may read drive command information, corresponding to the difference between the first pressure value and the second pressure value, from the memory 700, and adjust the height of the first seat 100 or the second seat 200 according to the drive command information read from the memory 700.

In one embodiment, the controller 600 can operate the first height adjusting unit 800 or the second height adjusting unit 900 for a predetermined time (preferably, 10 seconds).

In one embodiment, the controller 600 receives the first pressure value and the second pressure value from the seat pressure measuring unit 500 for a predetermined time (preferably, 2 seconds), and operate the first height adjusting unit 800 or the second height adjusting unit 900, of which the pressure value is high, for a predetermined time (preferably, 10 seconds). The operation may be repeated three times, and, after that, the operation may be stopped for 10 minutes. Then, the pressure may be again measured, and the above process may be repeated three times.

In one embodiment, the controller 600 may generate pressure distribution data according to the distribution of the pressure applied to the first seat 100 or the second seat 200.

The memory 700 stores in advance the drive command information corresponding to the difference between the first pressure value and the second pressure value. Therefore, in the case where the difference between the first pressure value and the second pressure value is a predetermined value or more, the height of the first seat 100 or the second seat 200 can be adjusted to 3 mm. In the case where the difference between the first pressure value and the second pressure value is lower than the predetermined value, the height of the first seat 100 or the second seat 200 can be adjusted to 1 mm. In this instance, the height adjusting range of the first seat 100 or the second seat 200 can be limited within 3 cm in order to prevent the spine from being deformed.

The first height adjusting unit 800 is provided between the first seat 100 and the frame 300, and adjusts the height of the first seat 100 according to the height adjusting signal from the controller 600.

The second height adjusting unit 900 is provided between the second seat 200 and the frame 300, and adjusts the height of the second seat 200 according to the height adjusting signal from the controller 600.

The functional chair 10 configured as described above may further include a power supply 1000, an input unit (not illustrated), and a display unit (not illustrated).

The power supply 1000 is supplied with a commercial electric power from the exterior, and converts the commercial electric power into a power required for the respective elements (e.g., the seat pressure measuring unit 500, the controller 600, the memory 700, the first height adjusting unit 800, and the second height adjusting unit 900) of the functional chair 10 to supply it to the elements.

The input unit inputs commands to operate the first height adjusting unit 800 or the second height adjusting unit 900, and to set an automatic mode.

In this instance, the controller 600 receives the command signal from the input unit to control the operation of the first height adjusting unit 800 or the second height adjusting unit 900.

The display unit receives the pressure distribution data from the controller 600 to display it on the screen.

With the above-described configuration, the functional chair 10 can separately support the left pelvis and the right pelvis and distribute the load by the first seat 100 and the second seat 200 which are separately provided to adjust the height respectively, keep the balance of the spine by restricting the height difference and range between the first seat 100 and the second seat 200, and make the waist comfortable by supporting a left side of the lumbar vertebrae and a right side of the lumbar vertebrae and thus keeping the left and right balances of the waist.

Figure 3:
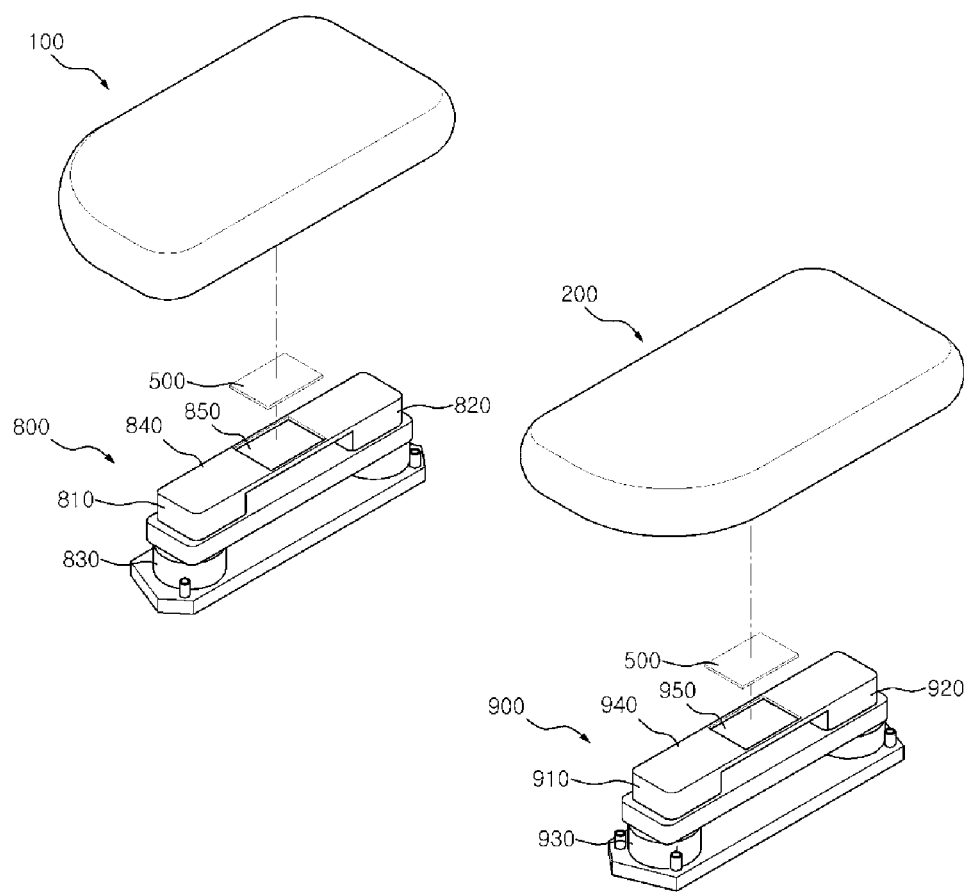
FIG. 3 is a view illustrating a first height adjusting unit and a second height adjusting unit in FIG. 1.

FIG. 3 is a view illustrating the first height adjusting unit and the second height adjusting unit in FIG. 1.

Referring to FIG. 3, the first height adjusting unit 800 has cylinder members 810 and 820, a hydraulic pump 830, a plate member 840, and a fixing member (not illustrated).

The cylinder members 810 and 820 are respectively provided on the front and rear portions of the upper portion of the frame 300, and are moved in a vertical direction. Therefore, the front and rear portions of the first seat 100 can be simultaneously moved up and down without wobbling.

In one embodiment, the cylinder members 810 and 820 may be separated from the plate member 840, or may be integrally formed with the plate member 840.

The hydraulic pump 830 is connected to the cylinder members 810 and 820 to supply a desired hydraulic pressure to the cylinder members 810 and 820.

The plate member 840 is provided on the cylinder members 810 and 820 to be moved up and down with the cylinder members 810 and 820, and the first seat 100 is positioned on the plate member 840.

In one embodiment, the plate member 840 may be provided with a mounting recess 850 to which the seat pressure measuring unit 500 (e.g., a contact pressure sensor, a load cell, etc.) is mounted. In this instance, the mounting recess 850 may be formed at a position corresponding to a portion which is brought into contact with ischia of user's buttocks.

The fixing member is provided between the first seat 100 and the plate member 840 to fix the first seat 100 and the plate member 840.

In one embodiment, the fixing member can fix a fixing means, such as fixing bolts, to the plate member 840 through the lower portion of the first seat 100, or can bond the first seat 100 and the plate member 840 with a glue means.

In the first height adjusting unit 800, although it has been described that the first seat 100 is separated from the plate member 840, the first seat 100 may be integrally formed with the plate member 840.

The second height adjusting unit 900 has cylinder members 910 and 920, a hydraulic pump 930, a plate member 940, and a mounting recess (950), which are substantially identical to the configuration of the first height adjusting unit 800 and thus are not described herein.

Figure 4:
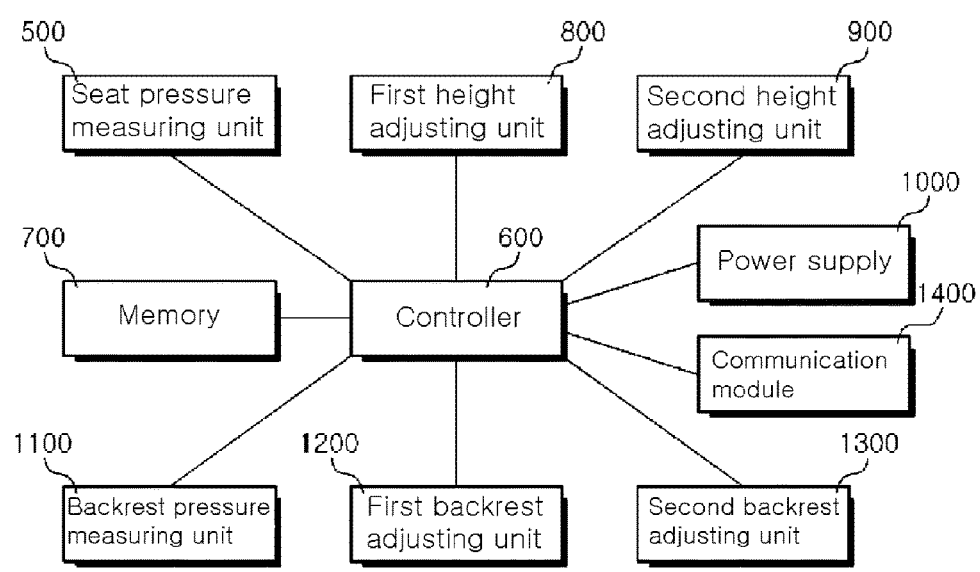
FIG. 4 is a view illustrating a functional chair according to the second embodiment of the present invention.

FIG. 4 is a view illustrating a functional chair according to the second embodiment of the present invention.

Referring to FIG. 4, a functional chair 10 includes a first seat 100, a second seat 200, a frame 300, a backrest 400, a seat pressure measuring unit 500, a controller 600, a memory 700, a first height adjusting unit 800, a second height adjusting unit 900, a power supply 1000, a backrest pressure measuring unit 1100, a first backrest adjusting unit 1200, a second backrest adjusting unit 1300, and a communication module 1400. The first seat 100, the second seat 200, the frame 300, the backrest 400, the seat pressure measuring unit 500, the controller 600, the memory 700, the first height adjusting unit 800, and the second height adjusting unit 900 are substantially identical to those in FIG. 1, and thus its description will be omitted herein. It will now be described based on the different configuration.

The backrest pressure measuring unit 1100 is provided on the left and right sides of the backrest 400 to measure the pressure.

In one embodiment, the backrest pressure measuring unit 1100 includes a contact pressure sensor and a load cell to measure the pressure.

In one embodiment, two backrest pressure measuring units 1100 may be provided on left and right sides of the backrest 400, or four backrest pressure measuring units 1100 may be provided on upper and lower portions of the left side of the backrest 400, and upper and lower portions of the right side of the backrest 400. Alternatively, the wanted number of backrest pressure measuring units 1100 may be provided on the backrest.

The first backrest adjusting unit 1200 is provided on the rear surface of the left side of the backrest 400 to adjust the left side of the backrest 400 in a forward or rearward direction.

In one embodiment, the first backrest adjusting unit 1200 may have a cylinder to pivot the left side of the backrest 400 in the forward or rearward direction.

The second backrest adjusting unit 1300 is provided on the rear surface of the right side of the backrest 400 to adjust the right side of the backrest 400 in the forward or rearward direction.

In one embodiment, the second backrest adjusting unit 1300 may have a cylinder to pivot the right side of the backrest 400 in the forward or rearward direction.

In this instance, the controller 600 receives the pressure value from the backrest pressure measuring unit 1100 to generate a control signal for adjusting the operation of the first backrest adjusting unit 1200 or the second backrest adjusting unit 1300, and can control the operation of the first backrest adjusting unit 1200 or the second backrest adjusting unit 1300 so that the pressure value of the left side of the backrest 400 is equal to that of the right side of the backrest 400.

The communication module 1400 receives a height adjusting command to adjust the height of the first height adjusting unit 800 or the second height adjusting unit 900 and a command to request pressure data from a smartphone, and sends them to the controller 600. Therefore, the user can adjust the height of the first seat 100 or the second seat 200 by the smartphone, and receive and verify the pressure data.

With the above-described configuration, the functional chair 10 can move the left and right sides of the backrest 400 independently, so that the shape of the chair is changed according to a body type of the user, thereby correcting the body type and posture of the user.

Figure 5:
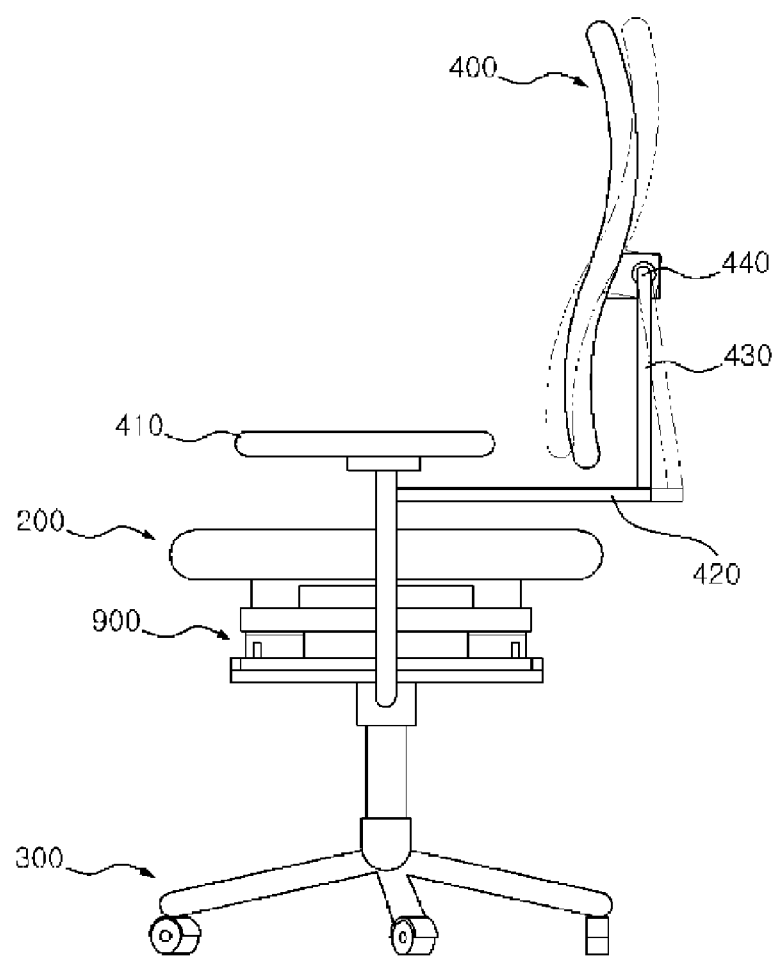
FIG. 5 is a view illustrating other example of a backrest in FIG. 1.

FIG. 5 is a view illustrating other example of the backrest in FIG. 1.

Referring to FIG. 5, the backrest 400 has armrests 410, levers 420, connecting bars 430, and hinges 440.

The armrests 410 are provided on each side of the first seat 100 and the second seat 200 to support both arms of the user. Therefore, if the user rests both arms on the armrests 410, it can release the tension in an upper body of the user.

The levers 420 are provided on lower portions of the armrests 410, and are pushed or pulled to adjust the left side or the right side of the backrest 400.

In one embodiment, when the lever 420 is pushed or pulled, the left side or the right side of the backrest 400 can be moved in the forward or rearward direction.

The connecting bars 430 connect one lever 420 and the left side of the backrest 400, and the other lever 420 and the right side of the backrest 400.

The hinge 440 is provided between the connecting bar 430 and the left side of the backrest 400 or between the connecting bar 430 and the right side of the backrest 400 to pivot the left side of the backrest 400 or the right side of the backrest 400. Therefore, when the lever 420 is pulled or pushed, the left side of the backrest 400 or the right side of the backrest 400 is adjusted in the forward or rearward direction. In addition, the left side of the backrest 400 or the right side of the backrest 400 can be tilted at an angle of about 15 degrees to about 30 degrees with respect to a horizontal level. Specifically, if the lever 420 is pulled, the left side of the backrest 400 or the right side of the backrest 400 is moved in the forward direction, and then is adjusted at an angle of about 15 degrees to about 30 degrees in the upward direction. If the lever 420 is pushed, the left side of the backrest 400 or the right side of the backrest 400 is moved in the rearward direction, and then is adjusted at an angle of about 15 degrees to about 30 degrees in the downward direction. As a result, the user can manually adjust the backrest 400.

Figure 6:
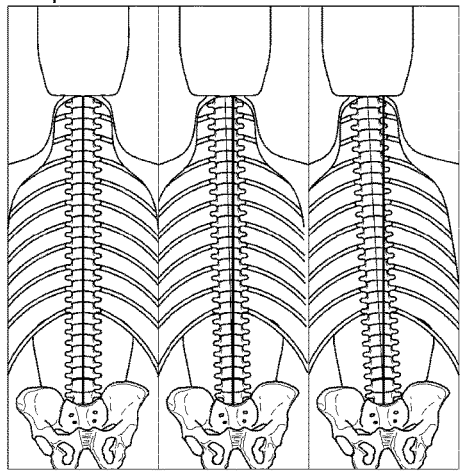
FIG. 6 is a view illustrating spine images when using the functional embodiment according to the first embodiment of the present invention.
Figure 6:
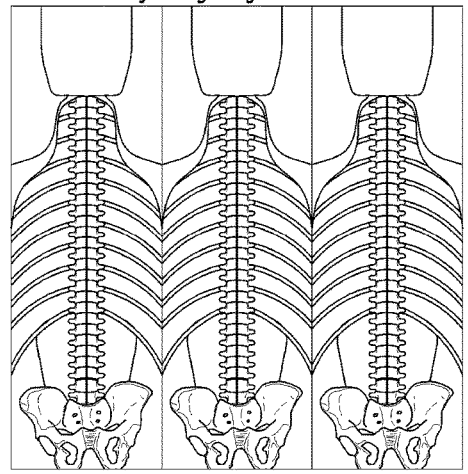

FIG. 6 is a view illustrating spine images when using the functional embodiment according to the first embodiment of the present invention.

Referring to FIG. 6, it would be seen from the left image that after a user with a left pelvis being lower than a right pelvis by about 3 mm sits on a general chair, the body is gradually inclined toward the left side of which the pelvis is low.

On the contrary, the right image shows the shape of the spine over time in the case of adjusting the height of the first seat 100 or the second seat 200 according to the body shape and the posture after the user with a left pelvis being lower than a right pelvis by about 3 mm sits on the functional chair 10 according to the present invention. Since the left seat (the first seat 100) is lifted by 7 mm so that the user's body is not inclined toward the left side, the user can maintain the spine in the straight even as time passed.

When the user sits on the functional chair 10, both pelvises are brought into contact with the first seat 100 and the second seat 200, but the positions which are brought into contact with both pelvises are generally different from each other. There are two portions, in which one portion comes into contact with the pelvis at first, and the other portion comes into contact with the pelvis later. More pressure is applied to the portion which comes into contact with the pelvis later, and the weight moves to the portion. In this instance, the functional chair lifts the height of one, to which the more pressure is applied, of the first seat 100 and the second seat 200.

Specifically, even though the user sits on the chair for a long time, the height of the first seat 100 and the second seat 200 is adjusted so that the spine should be positioned on the middle portion. Referring to a pressure distribution image after one hour, it would be seen that the pressure applied to the first seat 100 and the second seat 200 is substantially equal to each other.

The above embodiments of the present invention are not realized only by the above-described apparatus and/or method, but can be realized by a program capable of executing functions corresponding to the configuration of the embodiments of the present invention, or a recording medium on which the program is recorded in a computer readable manner. The realization can be easily achieved by those skilled in the art from the description of the above embodiments.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A functional chair comprising:
 a first seat configured to support a left pelvis;
 a second seat which is provided at a right side of the first seat and is configured to support a left pelvis;
 a frame which is provided below the first seat and the second seat to support the first and second seats;
 a backrest which protrudes from one side of the first and second seats in an upward direction to support a user's back;
 a seat pressure measuring unit which is respectively provided on the first seat and the second seat to measure pressure of the first and second seats and send a first pressure value and a second pressure value;
 a controller which receives the first pressure value and the second pressure value from the seat pressure measuring unit to generate a height adjusting signal for adjusting a height of the first and second seats;
 a memory which stores in advance drive command information corresponding to a difference between the first pressure value and the second pressure value;
 a first height adjusting unit which is provided between the first seat and the frame to adjust the height of the first seat according to the height adjusting signal from the controller; and a second height adjusting unit which is provided between the second seat and the frame to adjust the height of the second seat according to the height adjusting signal from the controller, wherein if the pressure value from the seat pressure measuring unit is not measured, the controller generates a standby mode signal to convert the first and second height adjusting units to a standby mode.

2. The functional chair according to claim 1, wherein the controller receives the first pressure values and the second pressure values from the seat pressure measuring unit for a predetermined time, calculates a first average value and a second average value, and lifts the seat having a higher value of the first average value and the second average value.

3. The functional chair according to claim 2, wherein the controller lifts the first seat or the second seat so that a difference between the first average value and the second average value becomes a predetermined value.

4. The functional chair according to claim 2, wherein if a difference between the first average value and the second average value is 10% or less, the controller generates a stop signal to stop operation of the first height adjusting unit or the second height adjusting unit.

5. The functional chair according to claim 2, wherein if a difference between the first average value and the second average value is 30% or more, the controller generates a warning signal to give a warning.

6. The functional chair according to claim 1, wherein the first height adjusting unit includes two cylinder members which are respectively provided on front and rear portions, and are moved in a vertical direction, a hydraulic pump which is connected to each cylinder member to supply hydraulic pressure to the cylinder members, a plate member which is provided on each cylinder member, the first seat being positioned on the plate member, and a fixing member which is provided between the first seat and the plate member to fix the first seat and the plate member.

7. The functional chair according to claim 1, further comprising a backrest pressure measuring unit which is respectively provided on left and right sides of the backrest to measure pressure;

a first backrest adjusting unit which is provided on a rear surface of the left side of the backrest to adjust the left side of the backrest in a forward or rearward direction; and a second backrest adjusting unit which is provided on a rear surface of the right side of the backrest to adjust the right side of the backrest in the forward or rearward direction.

8. The functional chair according to claim 7, wherein the controller controls operation of the first backrest adjusting unit and the second backrest adjusting unit so that the pressure value of the left side of the backrest is equal to that of the right side of the backrest.

9. The functional chair according to claim 1, further comprising a communication module which receives a height adjusting command to adjust the height of the first height adjusting unit or the second height adjusting unit and a command to request pressure data from a smartphone, and sends the commands to the controller.

* * * * *